United States Patent
Stewart et al.

[19]

[11] Patent Number: 6,000,738
[45] Date of Patent: Dec. 14, 1999

[54] FORCE-ABSORBING VEHICLE BUMPER

[75] Inventors: Robert L. Stewart, Rochester Hills; David J. Gasko, Rochester; Paul A. Martin, Birmingham; Dennis W. Jalbert, Macomb, all of Mich.

[73] Assignee: Chrysler Corporation, Auburn Hills, Mich.

[21] Appl. No.: 09/042,407

[22] Filed: Mar. 13, 1998

[51] Int. Cl.⁶ .................................................. B60R 19/02
[52] U.S. Cl. .......................................... 293/102; 293/120
[58] Field of Search .................................. 293/120, 122, 293/132, 133, 102

[56] References Cited

U.S. PATENT DOCUMENTS

| | | | |
|---|---|---|---|
| 4,018,466 | 4/1977 | Norlin | 293/71 |
| 4,348,042 | 9/1982 | Scrivo | 293/120 |
| 4,386,799 | 6/1983 | Molnar | 293/120 |
| 4,542,925 | 9/1985 | Huber et al. | 293/120 |
| 4,652,032 | 3/1987 | Smith | 293/120 |
| 4,671,550 | 6/1987 | Molnar | 293/120 |
| 4,830,416 | 5/1989 | Matsuoka | 293/120 |
| 4,951,986 | 8/1990 | Hanafusa et al. | 293/120 |
| 5,141,068 | 8/1992 | Mendicino | 180/68.3 |
| 5,154,462 | 10/1992 | Carpenter | 293/120 |
| 5,201,912 | 4/1993 | Terada et al. | 293/133 X |
| 5,271,650 | 12/1993 | Fukuhara et al. | 293/120 |
| 5,306,058 | 4/1994 | Sturrus et al. | 293/154 |
| 5,340,178 | 8/1994 | Stewart et al. | 293/132 X |
| 5,441,319 | 8/1995 | Oyama et al. | 293/155 |
| 5,462,325 | 10/1995 | Masuda et al. | 293/102 |
| 5,603,541 | 2/1997 | Wada et al. | 293/102 |
| 5,727,826 | 3/1998 | Frank et al. | 293/102 |

FOREIGN PATENT DOCUMENTS

| | | | |
|---|---|---|---|
| 406255433 | 9/1994 | Japan | 293/149 |

*Primary Examiner*—Joseph D. Pape
*Attorney, Agent, or Firm*—Lawrence J. Shurupoff

[57] ABSTRACT

A vehicle bumper includes a hollow tubular wall structure adapted to span the front or rear end of an automotive vehicle so as to absorb crash forces when the vehicle is involved in a crash situation at vehicle speeds above some predetermined speed level, e.g., five miles per hour. The hollow tubular wall structure includes an outer wall disposed to receive the crash force, an inner wall connectable to the vehicle, and four connector walls joining the outer wall to the inner wall. The four connector walls bend at a controlled rate to absorb crash energy. The outer and inner walls have aligned air openings adapted to conduct ram air to the vehicle radiator.

18 Claims, 2 Drawing Sheets

FORCE-ABSORBING VEHICLE BUMPER

BACKGROUND OF THE INVENTION

1. Field of the Invention

This invention relates to vehicle bumpers, and particularly to a vehicle bumper having force-absorbing capabilities.

2. Related Prior Developments

A force-absorbing bumper absorbs some of the crash force applied to it, rather than transmitting all of the crash force to the vehicle. The advantage of such a bumper is that it minimizes vehicle damage, and also reduces potential human injury.

Force-absorbing bumpers are well known. U.S. Pat. No. 4,018,466, issued to S. Norlin, shows a bumper that includes a rigid structural channel having several egg-crate energy-absorbing units. Each energy-absorbing unit includes a rectangular box having intersecting partitions that form individual cells. The cell spaces allow the partitions to collapse so as to absorb crash energy.

U.S. Pat. No. 4,348,042, issued to J. Scrivo, shows a vehicle bumper that includes a rigid channel having a thick energy-absorbing elastomeric strip. Apparently, the elastomeric strip absorbs crash energy by compressing in the direction of the crash force and expanding in a direction normal to the direction of the crash force.

U.S. Pat. No. 4,542,925, issued to G. Huber, shows an energy-absorbing bumper that includes a zig-zag leaf spring extending forwardly from a rigid support bar. Impact buffer pads are spaced along the support bar to cushion the rearward motion of the leaf spring in a crash situation.

U.S. Pat. No. 5,154,462, issued to R. Carpenter, shows an energy-absorbing bumper that includes an elongated rigid tubular support having a thick foam rubber strip extending along its front surface. During a crash, the foam rubber strip deforms to absorb crash energy.

SUMMARY OF THE INVENTION

The present invention relates to an energy-absorbing bumper that includes a hollow tubular wall structure adapted to span one end of a vehicle, i.e., either the front end or the rear end. The tubular wall structure includes an outer wall adapted to receive crash energy and an inner wall adapted to be attached to the vehicle or to shock-absorber struts carried by the vehicle.

The outer wall is connected to the inner wall by four separate connector walls spaced, one above another, so that the connector walls can deform and bend in response to the application of a crash force. The connector walls deform, in a controlled fashion, to absorb some of the crash energy.

The connector walls are constructed so as to be non-bendable until the crash energy reaches a predetermined level, e.g. an energy level attained by a crash occurring at a relatively low speed, e.g., five to ten miles per hour. At higher crash energy levels, the connector walls bend, in a controlled manner, to absorb some of the crash energy, thereby at least partly protecting the vehicle from damage to the chassis, body or interior hardware.

As an ancillary feature of the invention, the bumper can be formed with air openings in its front and rear walls. During operation of the vehicle some of the ram air can flow through the air openings. Such air can be used for radiator-cooling purposes or for engine combustion purposes. The bumper is constructed so that the air openings do not measurably interfere with the crash energy-absorbing function of the bumper.

Further features of the invention will be apparent from the attached drawings and description of a preferred embodiment of the invention.

DESCRIPTION OF A PREFERRED EMBODIMENT OF THE INVENTION

The vehicle bumper shown in FIGS. 1 through 4 includes an elongated hollow tubular wall structure 10 adapted to span one end of an automotive vehicle, e.g., a car or truck. The ends of tubular wall structure 10 are closed by end caps 12. Each end cap has a plug 14 fitting into an end opening in tubular wall structure 10, so that the end caps form rigid extensions of the tubular wall structure.

Figure 1:
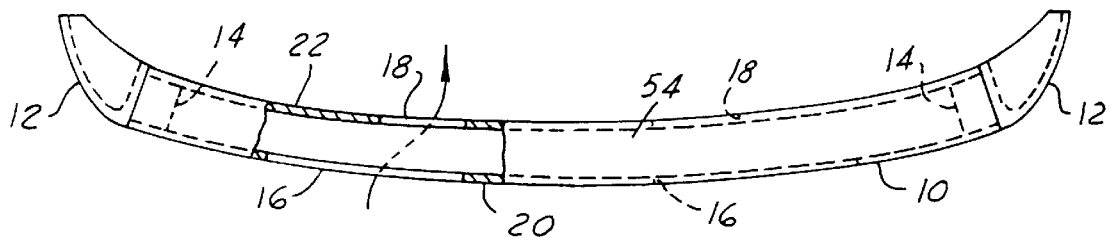
FIG. 1 is a top plan view of a vehicle bumper embodying features of the invention. Part of the bumper is shown in section, to illustrate certain air openings formed in the bumper walls.
Figure 2:
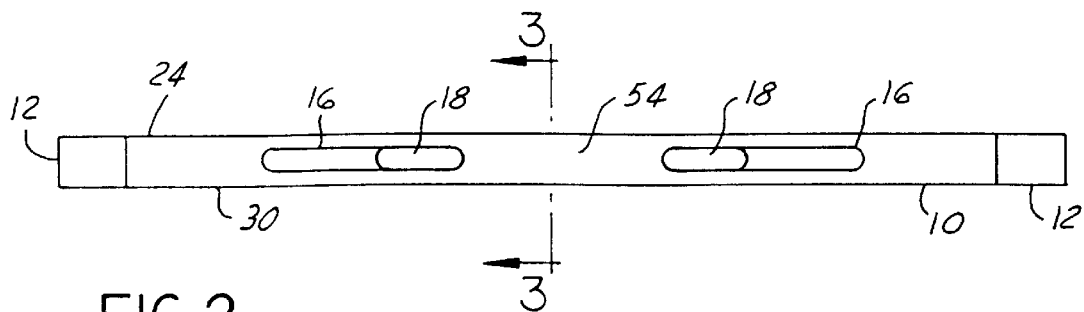
FIG. 2 is a front elevational view of the bumper depicted in FIG. 1.

The bumper shown in FIGS. 1 and 2 has aligned air openings 16 and 18 and its outer and inner walls, such that the bumper is especially adapted for disposition at the front end of a vehicle, i.e., directly in front of the air-cooled radiator. However, the same bumper design, without the air openings, can be used at the rear end of the vehicle. In either disposition of the bumper, the bumper is designed to absorb some crash energy at speeds above some predetermined value, e.g., above five or ten miles per hour.

Figure 3:
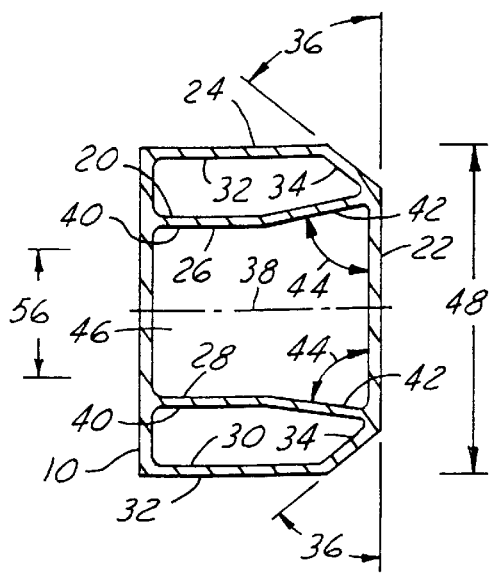
FIG. 3 is an enlarged cross-sectional view taken on line 3—3 in FIG. 2.
Figure 4:
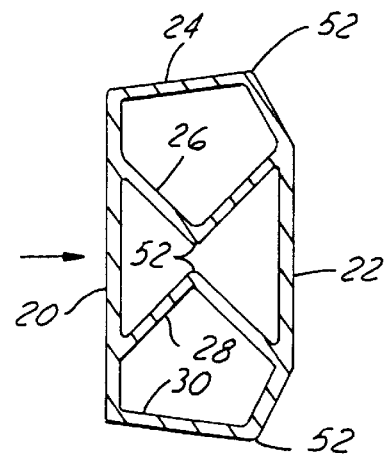
FIG. 4 is a view taken in the same direction as FIG. 3, but showing the bumper while it is being deformed to absorb crash energy.

The bumper wall structure 10 includes an outer wall 20 adapted to receive the crash impact force, and an inner wall 22 adapted to be attached to the vehicle or to shock-absorbing struts carried by the vehicle. As seen in FIGS. 3 and 4, walls 20 and 22 are connected together by four connector walls 24, 26, 28 and 30 that extend the full length of tubular wall structure 10.

Tubular wall structure 10 can be a one piece aluminum member formed by an extrusion process. The slight arcuate plan configuration of wall structure 10 depicted in FIG. 1 can be achieved by passing the heated extrusion through an array of mandrels, as shown, e.g., in U.S. Pat. No. 5,306,058, issued to P. Sturrus et al. The air openings 16 and 18 are formed in walls 20 and 22 after the tubular wall structure has been fully formed to its final configuration.

Connector wall 24 constitutes the upper wall of the tubular wall structure. Connector wall 30 constitutes the lower wall of the tubular wall structure. For reference purposes, connector walls 26 and 28 will be referred to as first and second intermediate connector walls.

As shown in FIG. 3, connector walls 24 and 30 include first wall sections 32 extending at right angles from outer wall 20, and second wall sections 34 extending from wall 22 at an acute angle 36. As shown in FIG. 3, the acute angle is, in each case, about fifty degrees. Connector walls 24 and 30 are mirror images of one another, in that these walls are symmetrical around an imaginary mid plane 38 taken through tubular wall structure 10. Acute angles 36 are directed away from mid plane 38, such that connector walls 24 and 30 will bend away from mid plane 38 when a crash force of appreciable magnitude is applied to outer wall 20.

Connector walls 26 and 28 include first wall sections 40 extending at right angles from outer wall 20 and second wall sections 42 extending from inner wall 22 at an acute angle 44. As shown in FIG. 3 acute angle 44 is about ten degrees. Walls 26 and 28 are equidistant from mid plane 38. The acute angles 44 are directed toward mid plane 38, such that walls 26 and 28 will bend toward mid plane 38 when a crash force of appreciable magnitude is applied to outer wall 20. The cross-sectional spacing between connector walls 28 and 26 is greater than the cross-sectional spacing between walls 24 and 26 and between walls 28 and 30, so that the central chamber 46 formed by walls 28 and 26 can accommodate the inward bending action of walls 28 and 26 in a controlled fashion.

In one embodiment, the hollow tubular wall structure 10 is designed so that the various walls have different wall thicknesses. For example, in a hollow tubular wll structure formed of aluminum, and having a height dimension 48 of about ninety five millimeters, the thickness dimension for wall 20 may be about 0.162 inch, the thickness dimension of wall 22 may be about 0.175 inch, the thickness dimension of each wall 24 or 30 may be about 0.115 inch, and the thickness dimension of each wall 2 6 or 28 may be about 0.100 inch. These thickness dimensions will vary according to the weight and crash resistance of the vehicle on which the bumper is used.

Connector walls 24, 26, 28 and 30 are designed to remain elastically deformable with little deformation (as shown in FIG. 3) as long as the crash force applied to outer wall 20 remains below a predetermined value, e.g., a value associated with a particular vehicle speed such as five or ten miles per hour. When the crash force exceeds this predetermined value, connector walls 24, 26, 28 and 30 will bend, as shown in FIG. 4. As the connector walls bend, they absorb some of the crash energy, thereby minimizing damage to the vehicle.

Figure 5:
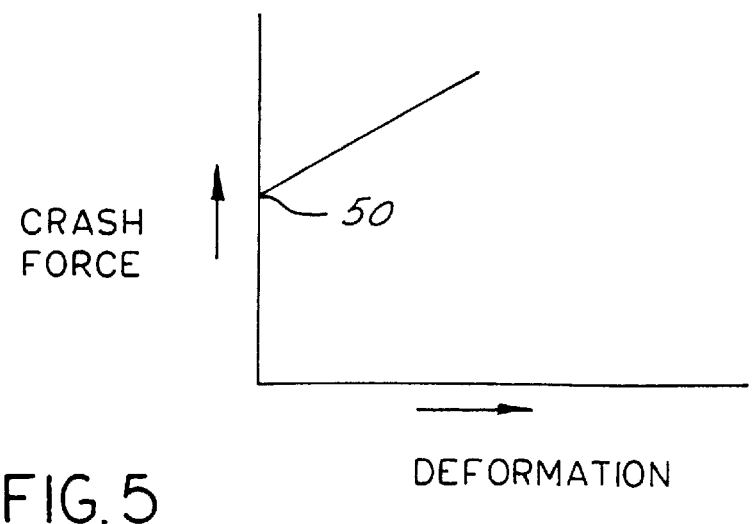
FIG. 5 is a chart showing generally how the bumper of FIGS. 1 through 4 deforms in response to the application of a crash force to the bumper outer wall.

FIG. 5 shows generally how the connector walls 24, 26, 28 and 30 are expected to perform. At crash force values below level 50, the connector walls remain substantially undeformed. As the crash force exceeds level 50, the connector walls begin to deform, as shown in FIG. 4.

Walls 24 and 26, together with the top portion of front wall 20 define an upper chamber and walls 28 and 30, together with a bottom portion of front wall 20, define a lower chamber. An intermediate or central chamber is defined between walls 26, 28, a central portion of front wall 20 and rear wall 22. The rear portions of the upper and lower chambers taper down toward the rear wall 22.

The upper and lower chambers have approximately equal cross-sectional areas and the intermediate chamber has a cross-sectional area greater than that of the upper and lower chambers. The intermediate chamber flares outwardly toward the rear wall along diverging wall sections 42, 42. Air openings 16, 18 define an air flow path through the intermediate chamber.

An aim of the invention is to provide each connector wall with the same bend resistance so that the connector walls will bend in unison when an appreciable crash force is applied to outer wall 20. Walls 20 and 22 will remain substantially parallel during a crash event so that any crash force transmitted to the vehicle will be in a generally horizontal direction, i.e., a direction in which the bumper connection fixtures have the maximum strength.

Each connector wall 26, 28 preferably has a lesser wall thickness than each connector wall 24, 30. However, the angulation at 44 is less than angulation 36, such that the bend resistance of each connector wall is approximately the same. The lesser angulation stiffens the thinner walls, whereas the greater angulation tends to weaken the thicker walls.

As shown in FIG. 4, each connector wall has two distinct flat linear wall sections joined together at a distinct bend line 52. This construction is preferred to an arcuate wall cross section, in that it promotes a predetermined bending action that is more predictable and controlled. Approximately the same bending action occurs, wherever the crash force is applied along the length of tubular wall structure 10 or along the height dimension of wall 20.

As noted earlier, walls 20 and 22 have aligned openings 16 and 18 designed to permit ram air to pass through, as indicated generally by the arrow in FIG. 1. As shown in FIGS. 1 and 2, outer wall 20 has two relatively large slot-like air openings 16 spaced equidistant from centerpoint 54 of the tubular wall structure 10, i.e., a point midway between the ends of wall structure 10.

Each air opening 16 is larger than the aligned air opening 18, to provide an accommodation space between walls 20 and 22 for dissipating turbulence generated by the pressure drop generated by air flow through each air opening 16. The turbulence produces a pressurized cushion alongside openings 16 and 18 that enables the air to flow in a relatively smooth fashion from each opening 16 through each aligned opening 18. Turbulence generated by each opening 16 is dissipated in the space between walls 20 and 22.

Each opening 16 has an area that is at least twice the area of the aligned opening 18 in order to dissipate the turbulence generated by the air flow through each opening 16. If the openings 16 and 18 were to be of the same area the turbulence generated by flow through each opening 16 would materially interfere with flow through opening 18, such that the total air flow would be undesirably reduced.

In FIG. 3, the height dimension of each slot-type air flow opening 16 or 18 is designated by numeral 56. The slot opening height is less than the height of central chamber 46 so that the air flows only through chamber 46. Walls 26 and 28 guide the air flow toward each air exit opening 18.

Figure 6:
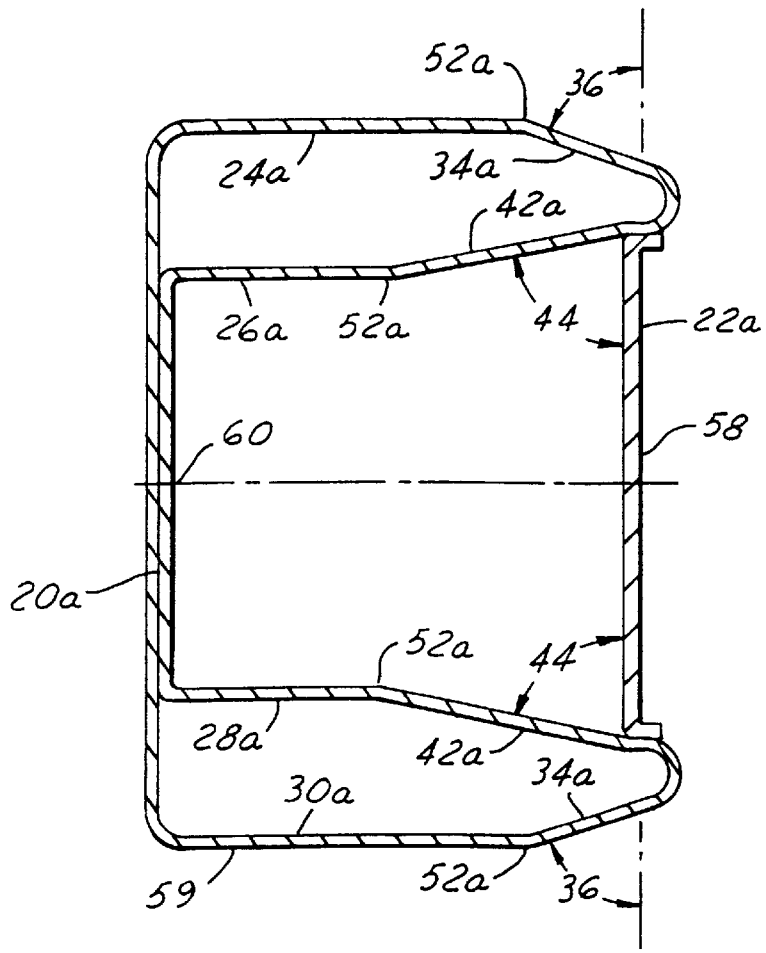
FIG. 6 is a sectional view taken in the same direction as FIG. 3, but showing another embodiment of the invention.

FIG. 6 shows an alternative form of the invention, wherein the tubular wall structure is formed out of steel roll-formed into a cross-sectional configuration that is approximately the same as the configuration depicted in FIG. 3. The FIG. 6 construction includes a main steel roll-form 59 jointed to an auxiliary steel stamping 58. Roll-forming 59 includes a steel sheet bent into the illustrated cross-sectional configuration, with the end edges of the steel welded together at 60. Outer walls 20a of the tubular wall structure is thus twice the sheet thickness so as to be resistant to deformation forces.

The inner wall 22a of the tubular wall structure has a greater wall thickness than the steel roll-form 59, such that inner wall 22a is resistant to bending forces.

Connector walls 24a, 26a, 28a and 30a are bendable around the bend lines 52a, so that the FIG. 6 tubular wall deforms in approximately the same fashion as the extruded tubular wall structure depicted in FIG. 3.

In the FIG. 6 construction, the second wall section 42a of wall connector wall 26a, 28a are acutely angled to the plane of each inner wall 22a by an acute angle that measures approximately ten degrees. The corresponding angulations of wall sections 34a relative to wall 22a measure about twenty degrees.

The crash performance of the FIG. 6 tubular wall structure is approximately the same as that of the FIG. 3 wall construction. In both cases, the bumper deforms substantially only when the crash force exceeds a predetermined level, e.g., a crash force associated with vehicle speeds in the area of five or ten miles per hour. The energy absorption level is preferably at ten g deceleration at a vehicle speed of about thirty miles per hour. Clearance openings for rear back-up or fog lamps can also be provided in the bumper in a manner similar to clearance holes 16 and 18.

What is claimed is:

1. A vehicle bumper comprising an elongated hollow tubular wall structure adapted for disposition at one end of a vehicle to absorb crash energy; said tubular wall structure comprising an outer wall adapted to receive a crash impact force, an inner wall spaced from said outer wall, and four separate connector walls joining said outer wall to said inner wall,
    wherein each connector wall has a first wall section extending at a right angle from said outer wall, and a second wall section extending at an acute angle from said inner wall.

2. The bumper structure of claim 1, wherein each connector wall has approximately the same bend resistance.

3. The vehicle bumper of claim 1, wherein the angulation of each said second wall section is in a range from about ten degrees to about fifty degrees.

4. The vehicle bumper of claim 1, wherein said connector walls include an upper connector wall, a lower connector wall, a first intermediate connector wall adjacent said upper wall, a second intermediate wall adjacent said lower wall, the angulation of the second wall section of each of said upper and lower connector walls being approximately 50°, and the angulation of the second wall section of each of said intermediate connector walls being approximately 10°.

5. A vehicle bumper comprising an elongated hollow tubular wall structure adapted for disposition at one end of a vehicle to absorb crash energy; said tubular wall structure comprising an outer wall adapted to receive a crash impact force, an inner wall spaced from said outer wall, and four separate connector walls joining said outer wall to said inner wall,
    wherein said outer wall has a first air passage opening therein, said inner wall has a second air passage opening therein aligned with said first opening such that ram air is enabled to flow through said openings.

6. The vehicle bumper of claim 5, wherein said first opening has a greater area than said second opening.

7. The vehicle bumper of claim 5, wherein the area of said first opening is a least twice the area of said second opening.

8. A vehicle bumper comprising an elongated hollow tubular wall structure adapted for disposition at one end of a vehicle to absorb crash energy; said tubular wall structure comprising an outer wall adapted to receive a crash impact force, an inner wall spaced from said outer wall, and four separate connector walls joining said outer wall to said inner wall,
    wherein said hollow tubular wall structure has two ends spaced equidistant from the bumper centerpoint; said outer wall having two air intake openings located equidistant from said centerpoint; said inner wall having two air exit openings aligned with said air intake openings, such that ram air is enabled to flow through said aligned openings.

9. The vehicle bumper of claim 8, wherein each said air intake opening has a greater area than each aligned air exit opening.

10. The vehicle bumper of claim 8, wherein the area of each air intake opening is at least twice the area of each aligned air exit opening.

11. A vehicle bumper comprising an elongated hollow tubular wall structure adapted for disposition at one end of a vehicle to absorb crash energy; said tubular wall structure comprising an outer wall adapted to receive a crash impact force, an inner wall spaced from said outer wall, and four separate connector walls joining said outer wall to said inner wall; said connector walls comprising an upper connector wall, a lower connector wall, a first intermediate connector wall proximate to said upper wall, and a second intermediate connector wall proximate to said lower wall,
    wherein each connector wall has first wall section extending at a right angle from said outer wall, and a second wall section extending at an acute angle from said inner wall; the acute angle being less for each intermediate wall than for the upper and lower walls.

12. A vehicle bumper comprising an elongated hollow tubular wall structure adapted for disposition at one end of a vehicle to absorb crash energy; said tubular wall structure comprising an outer wall adapted to receive a crash impact force, an inner wall spaced from said outer wall, and four separate connector walls joining said outer wall to said inner wall; said connector walls comprising an upper connector wall, a lower connector wall, a first intermediate connector wall proximate to said upper wall, and a second intermediate connector wall proximate to said lower wall, wherein said tubular wall structure has a horizontal mid plane located equidistant from said upper and lower connector walls; said first intermediate connector wall and said second intermediate connector wall being equidistantly spaced from said mid plane, such that said tubular wall structure is symmetrical around said mid plane,
    wherein the acute angles for said intermediate walls are directed toward said mid plane, and the acute angles for said upper and lower walls are directed away from said mid plane.

13. A bumper comprising:
    a tubular member having a front wall for receiving frontal impact and a rear reinforcing wall;
    an upper chamber, an intermediate chamber and a lower chamber, each of said chambers extending between said front and rear walls, and said upper and lower chambers each having a rear portion tapering toward said rear wall.

14. The bumper of claim 13, wherein said upper and lower chambers have approximately equal cross-sectional areas and wherein said intermediate chamber has a cross-sectional area greater than that of said upper and lower chambers.

15. The bumper of claim 13, wherein said intermediate chamber flares outwardly toward said rear wall.

16. The bumper of claim 13, wherein said front wall has at least one front hole formed therethrough and wherein said rear wall has at least one rear hole formed therethrough.

17. The bumper of claim 16, wherein said front and rear holes define an air flow path through said intermediate chamber.

18. A vehicle bumper comprising an elongated hollow tubular wall structure adapted for disposition at one end of a vehicle to absorb crash energy; said tubular wall structure comprising an outer wall adapted to receive a crash impact force, an inner wall spaced from said outer wall, and four separate connector walls joining said outer wall to said inner wall, wherein said outer wall has a first air passage opening therein, said inner wall has a second air passage opening therein arranged relative to said first opening in a manner such that ram air is enabled to flow through said openings.

* * * * *